United States Patent [19]

Blinka et al.

[11] Patent Number: 5,042,992

[45] Date of Patent: Aug. 27, 1991

[54] GAS SEPARATION MATERIAL

[75] Inventors: Thomas A. Blinka, Columbia, Md.; Hiroshi Itatani, Chiba, Japan; I-Fan Wang, Olney, Md.

[73] Assignee: W. R. Grace & Co.-Conn., New York, N.Y.

[21] Appl. No.: 497,045

[22] Filed: Mar. 21, 1990

[51] Int. Cl.$^5$ .................... B01D 53/22; B01D 71/64
[52] U.S. Cl. ........................ 55/16; 55/158; 528/313
[58] Field of Search ............ 55/16, 68, 158; 210/500, 39; 528/313, 321, 391

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 |
| 4,230,463 | 10/1980 | Henis et al. | 55/68 X |
| 4,690,873 | 9/1987 | Makino et al. | 55/158 X |
| 4,705,540 | 11/1987 | Hayes | 55/16 |
| 4,717,394 | 1/1988 | Hayes | 55/16 |
| 4,746,474 | 5/1988 | Kohn | 55/16 X |
| 4,830,640 | 5/1989 | Nakamura et al. | 55/16 X |
| 4,838,900 | 6/1989 | Hayes | 55/158 X |
| 4,880,442 | 11/1989 | Hayes | 55/16 |
| 4,897,092 | 1/1990 | Burgoyne, Jr. et al. | 55/158 X |
| 4,929,405 | 5/1990 | Kohn | 55/16 X |

FOREIGN PATENT DOCUMENTS

| | | | |
|---|---|---|---|
| 61-133118 | 6/1986 | Japan | 55/158 |
| 59251611 | 6/1986 | Japan | |

OTHER PUBLICATIONS

Kim et al., "Relationship Between Gas Separation Properties and Chemical Structure in a Series of Aromatic Polyimides," *Journal of Membrane Science*, 37 45-62 (1988).

*Primary Examiner*—Robert Spitzer
*Attorney, Agent, or Firm*—Vincent L. Fabiano; Valerie E. Looper

[57] ABSTRACT

A novel class of polyimides useful in making semipermeable membranes for gas separation is synthesized by the reaction of 4,4'-[hexafluoroisopropylidene]-bis-[phthalic anhydride] (6FDA) with 3,7-diamino-2,8-dimethyldiphenylenesulfone (AMPS). In lieu of the two methyl groups the diamine may be substituted by H or $C_{2-4}$ alkyl. Membranes made from the polyimides have high permeability for $CO_2$ from mixtures containing $CO_2$ and other gases such as $CH_4$ and have commercially acceptable selectivity.

25 Claims, No Drawings

GAS SEPARATION MATERIAL

FIELD OF THE INVENTION

The invention relates to a new class of polyimides and to their use in gas separation and related arts.

BACKGROUND OF THE INVENTION

Polyimides are well known in the preparation of membranes for gas separation, and films, etc., in other uses. A number of polyimides have been made by reacting various aromatic tetracarboxylic acids (and their anhydrides) with various aromatic diamines, and tested as membranes in gas separation. In general, results have been erratic and unpredictable.

Some Abbreviations

Herein,

6FDA means 4,4'-[hexafluoroisopropylidene]-bisphthalic anhydride]. It has the structure:

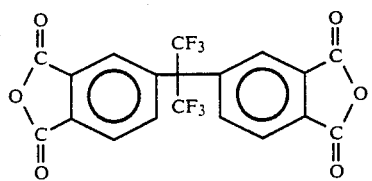

AMPS means 3,7-diamino-2,8-dimethyldiphenylenesulfone. It has the structure:

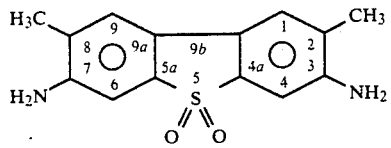

As available commercially (and as used in the examples hereinafter) it contains a minor amount (e.g., about 10% of position isomers, with one or both methyl groups in positions other than 2 and 8.

NMP means N-methyl-2-pyrrolidinone (sometimes called N-methyl-2-pyrrolidone in the literature).

DMAc means N,N-dimethylacetamide.

THF means tetrahydrofuran.

DMF means dimethylformamide.

DMSO means dimethylsulfoxide.

In this art the terms "membrane" and "film" are loosely interchangeable. In making materials for gas separation, "membrane" is typically used, whereas for other uses "film" is typical. On occasion "film" may be used in a generic sense to include membranes.

References

U.S. Pat. No. Re. 30,351, Hoehn et al. (1975, 1980), discloses reacting certain aromatic tetracarboxylic acids and anhydrides with certain aromatic diamines to make polyimides for gas separation films. The tetracarboxylic acid anhydride can be 6FDA (col. 8, l. 25); AMPS is not disclosed as the diamine.

U.S. Pat. No. 4,230,463, Henis et al. (1986) discloses coated hollow fibers for gas separation. The fibers are cellulose acetate, polysulfone, copoly(styreneacrylonitrile), polycarbonate, and brominated poly(xylene oxide). None were made from 6FDA-AMPS polymers. The coatings are various, including poly(dimethylsiloxane).

U.S. Pat. No. 4,690,873, Makino et al. (1987), also discloses reacting certain tetracarboxylic acids with certain aromatic diamines to make polyimides for gas separation films. The diamine can be AMPS; 6FDA is not disclosed. Makino shows (his Table I) that polyimide dense films made with AMPS show much lower permeabilities to $CO_2$ (typically 2-6 Barrers) than those of our invention (typically 190 Barrers, average for our Table I, below). Our selectivities, though lower than those of Makino, are commercially acceptable. (Comment, to convert values in Makino's Table to Barrers, divide by 10.)

U.S. Pat. No. 4,705,540 discloses syntheses of polyimides using 6FDA and certain diamines (not AMPS), and their use in preparing gas separation membranes. The asymmetric membranes were solution cast from dimethylformamide:water solutions.

U.S. Pat. No. 4,717,394 discloses preparation of polyimide gas separation membranes using polyimides containing 6FDA and certain diamines (but not sulfones). Asymmetric membranes were cast from 20% solutions of polymer in N-methyl pyrrolidone:water (97:3).

Japanese Patent Application SHO 59-251611 also discloses reacting certain tetracarboxylic acids and acid anhydrides with certain aromatic diamines to make polyimides for gas separation. The diamine can be AMPS; 6FDA is not disclosed.

Kim et al., *Relationship between Gas Separation Properties and Chemical Structure in a Series of Aromatic Polyimides*, Journal of Membrane Science, 37 (1988), 45–62, synthesized a number of polyimides by reacting tetracarboxylic acids and anhydrides (including 6FDA) with certain aromatic diamines (not including AMPS).

SUMMARY OF THE INVENTION

6FDA is reacted with a diaminodiphenylenesulfone of the structure:

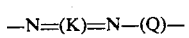

where (K) is

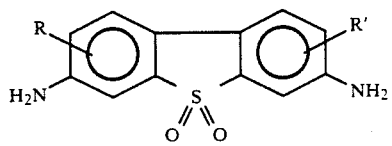

to prepare the corresponding polyimide, with the repeating structure:

(Q) is

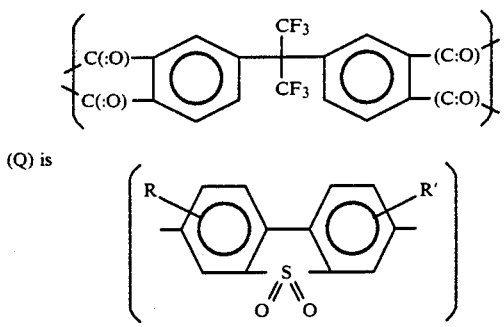

and R and R' are independently H or $C_{1-4}$ alkyl.

When R and R' are methyl in the 2,8-position, the diamine is the preferred diamine, AMPS. The new polyimides of this invention can be prepared with molecular weights ranging from 5,000 (and even below) up to 500,000 (and even higher). Polyimides in the molecular weight range of about 5,000–30,000 are useful in general film-making applications, including protective coatings, adhesives, water-resistant films, and the like. Our polyimides in the molecular weight range of about 30,000–500,000 (preferably 70,000–300,000) are eminently suitable in preparing gas separation membranes, as exemplified hereinafter.

In this synthesis, acids and esters based on 6FDA may be considered alternates of 6FDA.

DETAILED DESCRIPTION OF THE INVENTION

As above noted, the invention includes a new class of polyimides, made by reacting 6FDA with a diamine of the structure $H_2N-(Q)-NH_2$, where (Q) is as above defined. These materials have unexpected advantages in gas separation, with high permeability and acceptable selectivity.

The 6FDA-diamine reaction is conveniently carried out under nitrogen or other inert gas in an inert solvent (i.e., the synthesis solvent) at about 20°–200°0 C. for about 2–18 hours, after which the reaction solution is filtered and the polymer precipitated and recovered. As synthesis solvents we greatly prefer phenolic solvents, such as m-cresol, phenol, p-methoxyphenol, etc., or nonphenolic solvents such as NMP, DMF, DMAC, and DMSO. (For the latter abbreviations, see definitions above.) The synthesis solvent and the solvent used to prepare the dope could be, but are not necessarily the same. The polyimide can be used in gas separation in various configurations. For example, an asymmetric membrane can be prepared from a solution of the polyimide in the known way; that is to say, by "phase inversion casting", wherein the solution, or dope, is cast onto a support, some of the solvent is allowed to evaporate from the surface of the resulting membrane (whereby polymer concentration is increased on the surface); then the assembly is immersed in a non-solvent, e.g., water, whereby some of the solvent in the dope dissolves into the non-solvent, forming a thin, dense skin on the surface and inducing a sponge-like texture in the underlying layer of the polymer. Preparation of asymmetric membranes in this way is well known in the art.

The solvent(s) used in the dope used to prepare asymmetric membranes should be selected so that they are miscible in the immersion non-solvent. When water is the immersion non-solvent (preferred because it is cheap and effective), the dope solvent is suitably NMP, THF, DMAc, pyridine, DMF), DMSO, etc., or mixtures thereof. The concentration of polyimide in the final casting solution should be 5–35% polymer which provides a dope that is easily poured and cast.

For ultimate use the polyimide may be shaped as a film or membrane, singly or in composites, and/or in hollow tubes or fibers.

The following examples illustrate without limiting the invention.

EXAMPLE 1

A 3,000 ml resin kettle equipped with a Dean-Stark trap, reflux condenser, mechanical stirrer, and dry nitrogen gas inlet, was charged with approximately 1,200 ml of m-cresol, 200 ml of toluene, and 92.63 g (0.338 moles) of AMPS. The solution was dried by heating to reflux and collecting water by azeotropic distillation in the Dean-Stark trap. After cooling the solution to approximately 100° C., 150 g (0.338 moles) of 6FDA was added, along with approximately 150 ml of pyridine. The solution was maintained at 120° C. for 18 hours, during which time the solution became highly viscous. Another approximately 150 ml of toluene was added, and the solution was again heated to reflux for 4 hours to effect the imidization. Water produced by the imidization reaction was collected by azeotropic distillation in the Dean-Stark trap. The resulting viscous solution was precipitated in methanol, and dried for several days at 80° C. in a vacuum oven. The resulting polyimide had an inherent viscosity of 0.698 dl/g in DMF.

EXAMPLE 2

A 15 wt. % solution of 6FDA/AMPS polyimide, synthesized as in Example 1, was prepared in NMP. The solution was filtered and coated onto a glass plate with a casting blade set at a thickness of 350 μm. The membrane was placed in a convection oven and heated at 120° C. for 18 hours. The dry membrane was then delaminated from the glass plate in water and placed in a vacuum oven and heated at 150° C. for 18 hours.

The permeability and selectivity (the selectivity of a membrane to two gases is defined as the ratio of the permeabilities of the membrane to the gases of interest, generally such that the ratio is greater than one) were measured in a laboratory apparatus wherein a feed gas having a composition of 30% carbon dioxide and 70% methane at a pressure of approximately 220 psia was swept over the high pressure (feed) side of the membrane at a constant rate such that the gas composition remained constant. The permeability of the membrane to the gas mixture was determined by allowing the gas that permeated through the membrane (permeate gas) to fill an evacuated reservoir of known volume. The gas composition of the feed and permeate gas was determined by the use of a gas chromatograph. By measuring the rate of pressure increase in the reservoir, the gas temperature, the membrane area, the pressure differential between the two sides of the membrane, and the gas compositions of the feed and permeate gas, the permeability of the membrane to the components of the mixture was calculated through the use of the Ideal Gas Law. The results of the gas permeation test are contained in Table I.

EXAMPLE 3

(This is a substantial replicate of Example 2)

A 15 wt. % solution of 6-FDA/AMPS polyimide, synthesized as in Example 1, was prepared in NMP. The solution was filtered and coated onto a glass plate with a casting blade set at a thickness of 350 μm. The membrane was placed in a convection oven and heated at 120° C. for 18 hours. The dry membrane was then delaminated from the glass plate in water and placed in a vacuum oven and heated at 150° C. for 18 hours. The permeability of the membrane to carbon dioxide and methane was measured as described in Example 2. The results of the gas permeation test are contained in Table I.

EXAMPLE 4

A 15 wt. % solution of 6-FDA/AMPS polyimide synthesized as in Example 1, was prepared in NMP. The solution was filtered and coated onto a glass plate with a casting blade set at a thickness of 350 μm. The film was placed in a convection oven and heated at 120° C. for 18 hours. The dry film was then delaminated from the glass plate in water and placed in a vacuum oven and heated at 150° C. for 114 hours. The permeability of the membrane to carbon dioxide and methane was measured as described in Example 2. The results of the gas permeation test are contained in Table I.

TABLE I

| Membrane of Example No. | Carbon Dioxide Permeability* | Carbon Dioxide/ Methane Selectivity |
| --- | --- | --- |
| 2 | 234 | 55.9 |
| 3 | 169 | 49.1 |
| 4 | 178 | 44.0 |

*Permeability in Barrers = $10^{-10} \times cm^3 \times cm \times cm^{-2} \times s^{-1} \times (cm\ Hg)^{-1}$

EXAMPLE 5

Asymmetric membranes were prepared by casting from a 23% by weight solution of the 6FDA/AMPS polymer, prepared as in Example 1, in a solution of acetone:DMF:maleic acid (41:36:2 by weight) onto a woven nylon backing material using a 6-mil knife gap. The membrane was evaporated for 4 seconds at ambient temperature using an air knife, then immersed together with the backing into a water bath containing 0.1% Triton X-100 surfactant (octylphenoxypolyethoxyethanol). After coagulation, the resulting asymmetric membrane was washed with deionized water in a recirculating bath for 24 hours, then solvent exchange dried by immersion in 2-propanol for 15 minutes, followed by immersion in hexane for 15 minutes. The hexane wet membrane was then dried for 24 hours at ambient temperature.

The dried membrane was tested for gas permeability using a laboratory apparatus in which the flow rate of gas permeating through the membrane was measured by means of a soap bubble flow meter. When measuring the gas permeability of the membrane to gas mixtures, the high pressure feed gas mixture (10% $CO_2$, 90% $CH_4$; total pressure 1,000 psig) was allowed to sweep across one surface of the membrane at a rate sufficient to maintain constant feed gas composition at the membrane surface. The gas composition of the permeating gas was measured by means of a gas chromatograph. The permeation rates of $CH_4$ and $CO_2$, permeating through the membrane were calculated from the total pressure difference across the membrane, feed and permeate gas compositions as measured by the gas chromatograph, surface area of the membrane and total flow rate measured by means of the soap bubble flow meter. The permeability of the membranes to pure $CO_2$ and pure $CH_4$ were measured with a laboratory apparatus in which the membrane was exposed to a feed gas (either 100 psig $CO_2$ or 300 psig $CH_4$). The flow rate of the permeate gas was measured by means of a soap bubble flow meter. The permeation rate of the feed gas was calculated from the total pressure drop across the membrane, the membrane area, and the permeate gas flow rate. The results are listed in Table II.

EXAMPLE 6

An asymmetric membrane was prepared as in Example 5, except that after coagulation in the water bath, the membrane was soaked in 2-propanol for 30 minutes, then dried at ambient temperature.

The dried membrane was tested for gas permeability using the apparatus and gas mixture of Example 5. The results are listed in Table II.

EXAMPLE 7

An asymmetric membrane was prepared as in Example 5, except that the casting solution consisted of 22.7% FDA/AMPS polyimide, prepared as in Example 1, 44.6% NMP, 27.3% THF, 3.6% formamide, and 1.8% maleic acid. The solution was cast onto the woven nylon backing using a 5-mil blade gap and was evaporated for 6 minutes using an air knife at ambient temperature. Coagulation, washing, and drying of the membrane were carried out as described in Example 5.

The dried membrane was tested for gas permeability using the apparatus of Example 5, using pure gases. The results are listed in Table II.

EXAMPLE 8

The asymmetric membrane of Example 7 was soaked in a 5% solution of aminopropyl terminated polydimethylsiloxane in hexane, then air dried for 24 hours.

The dried membrane was tested for gas permeability using the apparatus and gas mixture of Example 5. The results are listed in Table II.

We can make hollow fibers from our new polyimides using conventional techniques. The following Examples 9-11 were not actually performed, but are offered as processes for making such hollow fibers.

EXAMPLE 9

Hollow fiber asymmetric membranes are formed using the casting solution of Example 5, except using a tubular die instead of casting as a flat sheet on a backing material. The evaporation, coagulation, and solvent exchange drying are carried out as described in Example 5, except that the asymmetric membrane has a hollow fiber rather than a flat sheet geometry.

EXAMPLE 10

Hollow fiber asymmetric membranes are formed using the casting solution of Example 5, except using a tubular die instead of casting as a flat sheet on a backing material. The evaporation, coagulation, and solvent exchange drying are carried out as described in Example 6, except that the asymmetric membrane has a hollow fiber rather than a flat sheet geometry.

EXAMPLE 11

Hollow fiber asymmetric membranes are formed using the casting solution of Example 7, except using a tubular die instead of casting as a flat sheet on a backing material. The evaporation, coagulation, and solvent exchange drying are carried out as described in Example 7, except that the asymmetric membrane has a hollow fiber rather than a flat sheet geometry.

EXAMPLE 12

A composite membrane was prepared by dip coating a polyetherimide (Ultem ™) porous substrate into a 2.5% by weight solution of 6FDA/AMPS, prepared as in Example 1, in acetone, then air drying to remove the acetone. The porous support was prepared by casting a solution containing 26% Ultem ™, 64% NMP, and 10% THF onto a woven nylon support and coagulating the resulting film in water containing 0.1% of Triton X-100 surfactant, then air drying.

This composite membrane was tested for gas permeability using the apparatus of Example 5, using pure gases. The results are listed in Table II.

TABLE II

| Membrane of Example No. | Carbon Dioxide Permeability* | Carbon Dioxide/ Methane Selectivity |
|---|---|---|
| 5 | 22$^{(a)}$ | 30$^{(a)}$ |
| 5 | 11$^{(b)}$ | 12$^{(b)}$ |
| 6 | 5.7$^{(b)}$ | 25$^{(b)}$ |
| 7 | 160$^{(a)}$ | 14$^{(a)}$ |
| 8 | 19$^{(b)}$ | 19$^{(b)}$ |
| 12 | 6$^{(a)}$ | 19$^{(a)}$ |

*Permeability in ft$^3$ × ft$^{-2}$ × hr$^{-1}$ × (100 psi)$^{-1}$
$^{(a)}$pure gas conditions: 100 psig CO$_2$, 300 psig CH$_4$ at ambient temperature
$^{(b)}$mixed gas conditions: 10 volume % CO$_2$/90 volume % CH$_4$ at 1,000 psi, ambient temperature
Percentages are by weight unless otherwise stated.

We claim:

1. Polyimide having the repeating structure —N=(K)=N—(Q)—
where (K) is

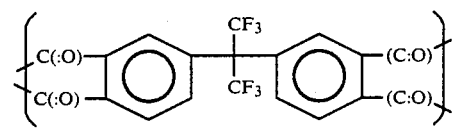

(Q) is

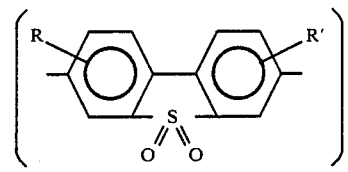

and R and R' are independently H or C$_{1-4}$ alkyl.

2. Polyimide according to claim 1 wherein R and R' are methyl in the 2,8 position.

3. Process of preparing a polyimide comprising reacting in an inert solvent, 4,4'-(hexafluoroisopropylidene)-bis-(phthalic anhydride) with a diaminodiphenylenesulfone of the formula:

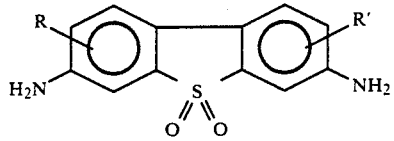

where R and R' are independently H or C$_{1-4}$ alkyl.

4. Process according to claim 3 wherein the diaminophenylenesulfone is 3,7-diamino-2,8-dimethyl-diphenylenesulfone.

5. Process according to claim 3 wherein the solvent is selected from the group consisting of m-cresol, p-methoxyphenol, phenol, N,N-dimethyl-acetamide, N-methyl-2-pyrrolidinone, tetrahydrofuran, N,N-dimethylformamide, pyridine, dimethylsulfoxide, or mixtures thereof.

6. Process according to claim 4 wherein the solvent is m-cresol.

7. Process according to claim 5 wherein the solvent is phenol.

8. Membrane comprising a polyimide of the repeating structure —N=(K)=N—(Q)
where (K) is

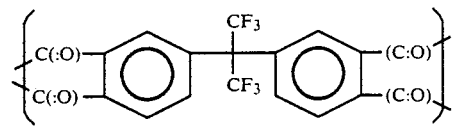

(Q) is

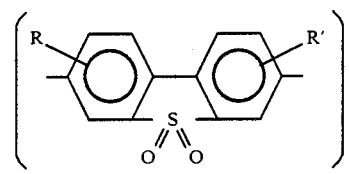

and R and R' are independently H or C$_{1-4}$ alkyl.

9. Membrane according to claim 8 wherein Q is

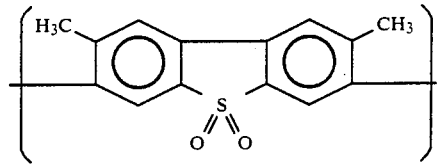

10. Asymmetric membrane comprising a membrane according to claim 8 prepared by phase inversion casting.

11. Membrane according to claim 10 wherein the membrane is a hollow fiber.

12. Asymmetric membrane comprising a membrane according to claim 9 prepared by phase inversion casting.

13. Membrane according to claims 8, 9, 10, 11, or 12, coated with aminopropyl terminated polydimethylsiloxane.

14. Membrane according to claim 12 wherein the membrane is a hollow fiber.

15. Process of separating a mixture of gases using the membrane of claim 8, wherein a feed gas stream contacts a first side of the membrane, under membrane separation conditions so that at least one component of the gas stream permeates through the membrane to be removed from a second side thereof.

16. Process of separating a mixture of gases using the asymmetric membrane of claim 12, wherein a feed gas stream contacts a first side of the membrane, under membrane separation conditions so that at least one component of the gas stream permeates through the membrane to be removed from a second side thereof.

17. Process according to claim 15 wherein the gas mixture comprises $CO_2$, wherein a feed gas steam contacts a first side of the membrane, under membrane separation conditions so that at least one component of the gas stream permeates through the membrane to be removed from a second side thereof.

18. Process according to claim 16 wherein the gas mixture comprises $CO_2$, wherein a feed gas stream contacts a first side of the membrane, under membrane separation conditions so that at least one component of the gas stream permeates through the membrane to be removed from a second side thereof.

19. Process of separating a mixture of gases using a membrane coated with aminopropyl terminated polydimethylsiloxane, said membrane consisting essentially of polyimide having the repeating structure

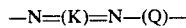

where (K) is

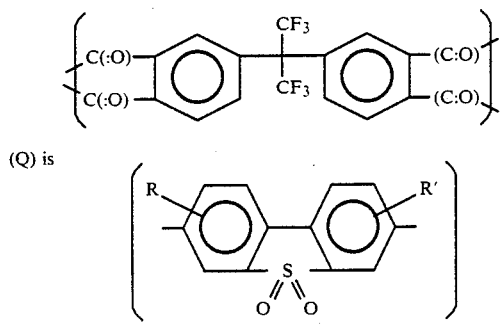

and R and R' are independently H or $C_{1-4}$ alkyl, wherein a feed gas stream contacts a first side of the membrane, under membrane separation conditions so that at least one component of the gas stream permeates through the membrane to be removed from a second side thereof.

20. Gas separation apparatus comprising a gaspermeation module, a gas inlet and a gas outlet connected to said module, and a semi-permeable membrane dividing the cell between the inlet and the outlet; characterized in that the membrane comprises a polyimide having a repeating unit structure of —N=(K)=N—(Q)— where

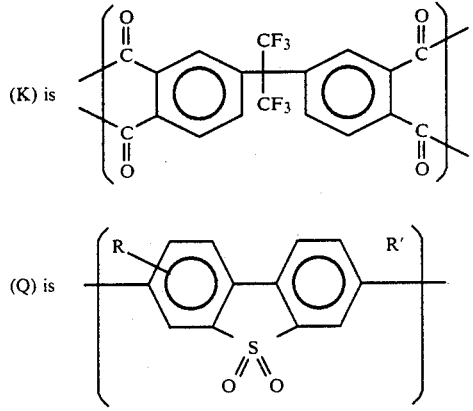

and R and R' are independently H or $C_{1-4}$ alkyl.

21. Apparatus according to claim 20 and R and R' are independently H or $C_{1-4}$ alkyl, wherein in the polyimide R and R' are methyl in the 2,8 position.

22. Apparatus according to claim 20 wherein the membrane is an asymmetric membrane.

23. Apparatus according to claim 22 wherein the asymmetric membrane is in the for of a hollow fiber.

24. Apparatus according to claim 21 wherein the membrane is an asymmetric membrane.

25. Apparatus according to claim 24 wherein the asymmetric membrane is in the form of a hollow fiber.

* * * * *